(12) United States Patent
Sugawara

(10) Patent No.: US 11,624,856 B2
(45) Date of Patent: Apr. 11, 2023

(54) METHOD FOR MANUFACTURING ANTI-GLARE FILM

(71) Applicant: DAICEL CORPORATION, Osaka (JP)

(72) Inventor: Yoshitaka Sugawara, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 593 days.

(21) Appl. No.: 16/492,773

(22) PCT Filed: Mar. 23, 2018

(86) PCT No.: PCT/JP2018/011637
§ 371 (c)(1),
(2) Date: Sep. 10, 2019

(87) PCT Pub. No.: WO2018/220960
PCT Pub. Date: Dec. 6, 2018

(65) Prior Publication Data
US 2021/0141123 A1 May 13, 2021

(30) Foreign Application Priority Data

May 29, 2017 (JP) ............................. JP2017-105775

(51) Int. Cl.
*G02B 1/111* (2015.01)
*G02B 1/14* (2015.01)
(Continued)

(52) U.S. Cl.
CPC ................ *G02B 1/111* (2013.01); *B05D 5/02* (2013.01); *G01N 21/4738* (2013.01);
(Continued)

(58) Field of Classification Search
None
See application file for complete search history.

(56) References Cited

U.S. PATENT DOCUMENTS

2005/0163977 A1   7/2005 Miyatake et al.
2014/0254020 A1*  9/2014 Sakajiri ................. G02B 1/11
                                            359/601
2017/0299778 A1* 10/2017 Kajiya .................. B29C 33/42

FOREIGN PATENT DOCUMENTS

CN     1639589 A      7/2005
JP     2006-170925 A  6/2006
(Continued)

OTHER PUBLICATIONS

Machine Translation of JP-2010066548-A (Year: 2010).*
(Continued)

*Primary Examiner* — Shamim Ahmed
*Assistant Examiner* — Bradford M Gates
(74) *Attorney, Agent, or Firm* — Birch, Stewart, Kolasch & Birch, LLP

(57) ABSTRACT

Gloss of a surface having a concave-convex structure is measured, and R/V, which is a ratio of a diffuse specular reflection intensity R to a sum total V of diffuse reflection intensities (in formula, the diffuse specular reflection intensity R represents a diffuse reflection intensity measured at an aperture angle of 1 degree by a variable-angle photometer in a diffuse specular reflection direction when visible light is radiated, at an angle of 45 degrees from a normal line, to the surface having the concave-convex structure of the anti-glare film, and the sum total V of diffuse reflection intensities represents a sum total of diffuse reflection intensities measured at an aperture angle of 1 degree by a variable-angle photometer for every 1 degree from −45 degrees up to 45 degrees, including 0 degrees, with respect to the diffuse (Continued)

specular reflection direction when visible light is radiated, at an angle of 45 degrees from a normal line, to the surface having the concave-convex structure of the anti-glare film), is evaluated to manufacture an anti-glare film. The above-described method enables an anti-glare film having high anti-glare properties and high contrast to be manufactured at high productivity.

7 Claims, 1 Drawing Sheet

(51) Int. Cl.
  *B05D 5/02* (2006.01)
  *G01N 21/47* (2006.01)
  *G01N 21/57* (2006.01)
  *G02B 1/12* (2006.01)
  *G02B 5/02* (2006.01)

(52) U.S. Cl.
  CPC .............. *G01N 21/57* (2013.01); *G02B 1/12* (2013.01); *G02B 1/14* (2015.01); *G02B 5/02* (2013.01)

(56) References Cited

FOREIGN PATENT DOCUMENTS

| JP | 2009-244305 A | | 10/2009 | |
|---|---|---|---|---|
| JP | 2010066548 A | * | 3/2010 | |
| JP | 2013-61636 A | | 4/2013 | |
| JP | 5531388 B2 | | 6/2014 | |
| WO | WO-2016035776 A1 | * | 3/2016 | ............ B29C 33/42 |

OTHER PUBLICATIONS

International Search Report, issued in PCT/JP2018/011637, PCT/ISA/210, dated Apr. 17, 2018.
Written Opinion of the International Searching Authority, issued in PCT/JP2018/011637, PCT/ISA/237, dated Apr. 17, 2018.
Office Action dated Apr. 12, 2021, in Chinese Patent Application No. 201880028383.X.
International Preliminary Report on Patentability arid English translation of the Written Opinion of the International Searching Authority for international Application No. PCT/JP2018/011637, dated Dec. 12, 2019.

* cited by examiner

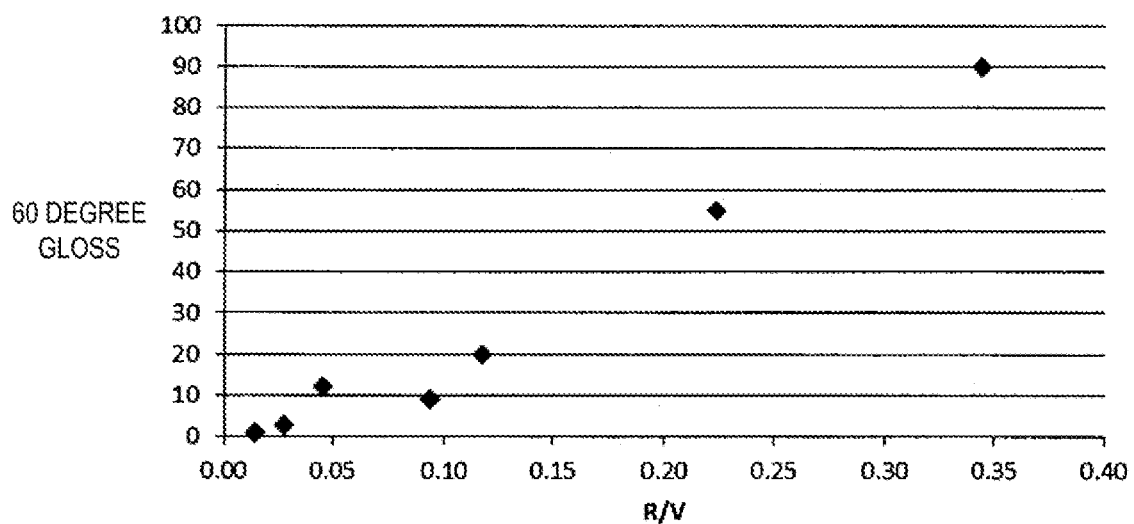

METHOD FOR MANUFACTURING ANTI-GLARE FILM

TECHNICAL FIELD

The present invention relates to a method for continuously manufacturing an anti-glare film that has excellent balance between anti-glare properties and contrast while selecting the anti-glare film.

BACKGROUND ART

In a variety of image display devices of liquid crystal display devices (LCDs) and organic electroluminescence (EL) display devices (OLEDs), an anti-glare film for diffusing surface-reflection light to prevent reflection of an external light source or the like is layered on a display screen to improve visibility. However, excessively strong light diffusing functions of the anti-glare film lower the contrast in an image, making it difficult to display a sharp image. While in recent years, development of high definition display has advanced in LCDs and OLEDs, there has been a demand for anti-glare films that can achieve both anti-glare properties and contrast. It is difficult for both properties required for such anti-glare films to be compatible. Thus, even when the anti-glare films are manufactured with the same formulation, production of lots that satisfy neither of the above properties occurs, and in actual manufacture, optical properties of each of the obtained films need to be evaluated. Further, as a method for evaluating both of the above properties, although a method for adjusting haze value has been known, the haze value is not necessarily correlated with the contrast.

To address this, JP 5531388 B (Patent Document 1) discloses a method for manufacturing an optical sheet that includes a functional layer on at least one surface of a transparent substrate and a diffusion element on the outermost surface and/or the interior of the functional layer. The method disclosed is for stably manufacturing an optical sheet having excellent contrast by controlling a ratio of diffuse specular reflection intensity to a sum total of diffuse reflection intensities measured at a predetermined angle to become greater than 0.19.

However, according to the above method, it is necessary to perform off-line inspection using a variable-angle photometer to measure the ratio of reflection intensities, but the variable-angle photometer needs to conduct measurement in a stationary state, thus making it impossible to perform a continuous manufacture within a manufacturing apparatus, and this causes the productivity to stay at a low level.

CITATION LIST

Patent Document

Patent Document 1: JP 5531388 B (claim 1)

SUMMARY OF INVENTION

Technical Problem

Accordingly, an object of the present invention is to provide a method for manufacturing an anti-glare film with intended anti-glare properties and contrast at high productivity.

Solution to Problem

The inventors have conducted diligent research to achieve the above object and, as a result of the research, discovered that there is a correlation between gloss and R/V, which is a ratio of a diffuse specular reflection intensity R to a sum total V of diffuse reflection intensities measured at a predetermined angle, and the inventors, by measuring gloss to evaluate properties of anti-glare film, discovered that an anti-glare film with high anti-glare properties and high contrast can be manufactured at high productivity, and completed the present invention.

That is, a method for manufacturing an anti-glare film of the present invention involves an evaluation process for measuring gloss of a surface having a concave-convex structure, and evaluating R/V, which is a ratio of a diffuse specular reflection intensity R to a sum total V of diffuse reflection intensities (where, the diffuse specular reflection intensity R represents a diffuse reflection intensity measured at an aperture angle of 1 degree by a variable-angle photometer in a diffuse specular reflection direction when visible light is radiated, at an angle of 45 degrees from a normal line, to the surface having the concave-convex structure of the anti-glare film, and the sum total V of diffuse reflection intensities represents a sum total of diffuse reflection intensities measured at an aperture angle of 1 degree by a variable-angle photometer for every 1 degree from −45 degrees up to 45 degrees, including 0 degree, with respect to the diffuse specular reflection direction when visible light is radiated, at an angle of 45 degrees from a normal line, to the surface having the concave-convex structure of the anti-glare film). In the manufacturing method of the present invention, a lower limit of gloss where R/V is 0.01 may be predetermined, and then in the evaluation process, an anti-glare film having gloss that exceeds the lower limit of the gross may be selected. In the evaluation process, 60 degree gloss may be measured. When measuring the 60 degree gloss, anti-glare films having 60 degree gloss that exceeds 45% may be selected in the evaluation process. The manufacturing method of the present invention may further involve a concave-convex structure formation process for forming a concave-convex structure on a surface of an anti-glare film, and the concave-convex structure formation process and the evaluation process may be continuously performed. In the concave-convex structure formation process, a curable composition containing a curable resin may be cured. The curable composition may contain microparticles. The curable composition may contain a phase-separable resin component.

Advantageous Effects of Invention

According to an embodiment of the present invention, there is a correlation between gloss and R/V, which is a ratio of the diffuse specular reflection intensity R to a sum total V of diffuse reflection intensities measured at a predetermined angle, and the gloss is measured to evaluate properties of an anti-glare film, thus enabling in-line inspection (under a continuous process of a manufacturing apparatus in operation), whereby, an anti-glare film with intended anti-glare properties and contrast can be manufactured at high productivity. Thus, the anti-glare film with high anti-glare properties and high contrast, and an anti-glare film with excellent balance between anti-glare properties and contrast can be continuously manufactured while performing inspection on the anti-glare film.

BRIEF DESCRIPTION OF DRAWINGS

FIG. 1 is a graph illustrating a relationship between R/V and 60 degree gloss in anti-glare films manufactured in the examples.

DESCRIPTION OF EMBODIMENTS

Evaluation Process

The manufacturing method of an anti-glare film according to an embodiment of the present invention involves a process of measuring gloss of a surface (concave-convex surface) having a concave-convex structure, and evaluating R/V, which is a ratio of a diffuse specular reflection intensity R to a sum total V of diffuse reflection intensities. According to an embodiment of the present invention, a correlation between R/V and gloss is discovered, and in place of evaluating R/V, evaluation of gloss is performed to evaluate properties of an anti-glare film. Gloss can be measured even in a continuous process (in-line) during a non-stationary operation, and thus the productivity can be significantly improved compared to the evaluation process of measuring R/V, which requires off-line inspection.

According to an embodiment of the present invention, the lower limit of R/V required to manufacture an anti-glare film with high anti-glare properties and high contrast may be 0.01 or greater, preferably 0.05 or greater, and more preferably 0.1 or greater (specifically, 0.15 or greater). To manufacture an anti-glare film with an even higher degree of anti-glare properties and contrast, the lower limit of R/V may be greater than 0.19, preferably greater than 0.2, and more preferably greater than 0.21. When R/V is excessively small, the contrast may unfavorably decrease. On the other hand, the upper limit of R/V may be less than 0.35, and more preferably less than 0.31. Excessively high R/V may lower anti-glare properties.

As a method for measuring R/V, the method disclosed in Patent Document 1 (JP 5531388 B) may be adopted, and specifically, R/V can be measured by the method stated in Examples to be described below.

According to an embodiment of the present invention, R/V required for an anti-glare film is selected from the above-described range and determined, and then a gloss corresponding to the range of R/V is evaluated to select a required anti-glare film, to thereby enable the manufacture of an anti-glare film at high productivity. For example, in manufacturing an anti-glare sheet with R/V of 0.01 or greater, R/V and gloss of a plurality of concave-convex surfaces with different glosses may be measured to create a calibration curve, to thus determine the lower limit of gloss where R/V is 0.01. In the evaluation process, selecting an anti-glare film that exceeds the lower limit of gloss enables continuous performance of the evaluation process and a concave-convex structure formation process of forming a concave-convex structure on a surface of an anti-glare film.

The measurement angle of gloss (degree of brilliance) is not specifically limited, and can be selected in accordance with the degree of brilliance of the concave-convex surface, where examples of the angle include 20 degrees, 45 degrees, 60 degrees, 75 degrees, and 85 degrees, for example. Among these measurement angles, the angle of 60 degrees is preferred because of easiness of control and broad measurement range thereof. Gloss corresponding to the above-described range of R/V may be selected, and, for example, the lower limit of 60 degree gloss may be greater than 45%, preferably greater than 50%, and more preferably greater than 52%. On the other hand, the upper limit of 60 degree gloss may be less than 92%, and preferably less than 80%.

Note that in the present specification and claims, gloss such as 60 degree gloss can be measured, in compliance with JIS K7105, by using a gloss meter ("IG-320" available from HORIBA, Ltd.).

Concave-Convex Structure Formation Process

The manufacturing method according to an embodiment of the present invention may involve a concave-convex structure formation process as a process preceding the evaluation process. According to an embodiment of the present invention, because the evaluation process can be performed in-line, the concave-convex structure formation process and the evaluation process can be sequential processes.

In the concave-convex structure formation process, a material of an anti-glare film for forming the concave-convex structure on a surface thereof is not specifically limited as long as the material is transparent, and may be any of an inorganic material such as glass, an organic material such as a resin component, and a combination of an inorganic material and an organic material, but in terms of productivity, a material containing a resin component (a resin component such as a thermoplastic resin or a curable resin) may be preferably used.

In the concave-convex structure formation process, a method for forming a concave-convex structure on a surface is not specifically limited as long as the method can provide a concave-convex structure to the surface of an anti-glare film. The method can be appropriately selected in accordance with the material of the anti-glare film, for example, a method for curing a curable composition containing a curable resin (for example, a method for causing microparticles in a curable composition to protrude to obtain a cured curable composition, a method for curing a resin component of a curable composition containing a phase-separable resin component after phase-separating the resin component or the like), a method for performing transfer by using a mold having a concave-convex structure on a surface thereof, a method for forming a concave-convex structure by a cutting operation (for example, a cutting operation using a laser or the like), a method for forming a concave-convex structure by polishing (for example, a sand blasting method, a bead shot method or the like), or a method for forming a concave-convex structure by etching, and the like.

Among these methods, in terms of manufacturing an anti-glare film having a concave-convex structure on a surface thereof at high productivity, the method for curing a curable composition containing a curable resin is preferably used, where, for example, a method, in which a curable composition is applied onto a support body and dried, and then cured, may be employed.

The support body may be a support body formed of a transparent material because of the applicability thereof as a base material layer of the anti-glare film without any modification. The transparent material may be an inorganic material such as glass, but organic materials such as cellulose derivatives, polyesters, polyamides, polyimides, polycarbonates, (meth) acrylic-based polymers, or the like are commonly used in terms of strength, moldability, and the like. Among these, because of excellent balance in mechanical properties, transparency, and the like, a film formed of cellulose acetate such as cellulose triacetate (TAC), or a film (specifically, an unstretched film) formed of polyalkylene arylate such as polyethylene terephthalate (PET) or polyethylene naphthalate (PEN) is preferred.

The curable resin may be a thermosetting resin or a photocurable resin, but in terms of the productivity and the like, a (meth) acrylic photocurable resin is commonly used. Examples of the (meth) acrylic photocurable resin include multifunctional (meth) acrylates (for example, (meth) acrylates having approximately from 2 to 8 polymerizable groups such as pentaerythritol tetra (meth) acrylate, dipentaerythritol penta (meth) acrylate, and dipentaerythritol hexa (meth) acrylate), epoxy (meth) acrylate, polyester (meth) acrylate, urethane (meth) acrylate, silicone (meth) acrylate, and (meth) acrylic resin having polymerizable groups, for example.

In addition to curable resins, the curable composition may further contain microparticles or polymer components, initiating reagents, and commonly used additives, which will be described below. The curable composition takes a liquid form, and usually contains a solvent that can dissolve a curable composition.

Application methods are commonly used methods such as a roll coater, air knife coater, blade coater, rod coater, reverse coater, bar coater, comma coater, dip-squeeze coater, die coater, gravure coater, micro-gravure coater, and silk-screen coater method, and a dip method, a spray method, and a spinner method, for example. Among these methods, the bar coater method, the gravure coater method, and the like are commonly used. Note that the coating solution may be applied a plurality of times where necessary.

The drying temperature ranges, for example, approximately from 0 to 120° C., preferably from 30 to 110° C., and more preferably from 50 to 105° C. (particularly from 60 to 100° C.). The drying time ranges, for example, approximately from 0.1 to 10 minutes, preferably from 0.3 to 5 minutes, and more preferably from 0.5 to 3 minutes.

It suffices that the curing method be any method that provides an active light beam (ultraviolet light, an electron beam, or the like), heat or the like, where heating, photoirradiation, and the like may be combined in accordance with the type of curable resin.

The heating temperature can be selected from a suitable range, for example, approximately from 50 to 150° C. The light irradiation can be selected in accordance with the type of light-curing component or the like, where ultraviolet radiation, an electron beam, or the like can be used. The commonly used exposure source is typically an ultraviolet irradiation device.

For example, in a case of ultraviolet light, there can be used, for the light source, a Deep UV lamp, a low-pressure mercury lamp, a high-pressure mercury lamp, an ultra-high-pressure mercury lamp, a halogen lamp, and a laser-light source (a light source such as a helium-cadmium laser, an excimer laser, or the like). The irradiance (irradiation energy) varies depending on the thickness of a coating film, which is, for example, approximately from 10 to 10000 mJ/cm$^2$, preferably from 20 to 5000 mJ/cm$^2$, and more preferably from 30 to 3000 mJ/cm$^2$. The light irradiation may be performed in an inert gas atmosphere, where necessary.

In methods of curing such a curable composition, methods of forming a concave-convex structure on a surface include a method for blending microparticles in the curable composition to cause the microparticles to protrude to obtain a cured curable composition (a method for using microparticles), and a method for blending a phase-separable resin component into the curable composition and then curing the resin component after the phase separation of the resin component (a method for using phase separation).

In the method for using microparticles, the surface may be formed with a concave-convex structure by curing the curable composition, with the microparticles protruding from the surface. Examples of the microparticles include inorganic microparticles such as silica particles, titania particles, zirconia particles, and alumina particles, and organic microparticles such as copolymer particles of (meth) acrylic monomers and styrene-based monomers, crosslinked (meth) acrylic polymer particles, and crosslinked styrene-based resin particles. These microparticles can be used alone or in combination of two or more types. Among these, crosslinked (meth) acrylic polymer particles and the like are commonly used. The average particle size of the microparticles can be selected in accordance with the concave-convex structure being required, which ranges, for example, approximately from 1 to 10 μm, preferably from 2 to 8 μm, and more preferably from 3 to 5 μm. The ratio of the microparticles ranges, for example, approximately from 1 to 30 parts by weight, preferably from 2 to 20 parts by weight, and more preferably from 5 to 10 parts by weight, per 100 parts by weight of the curable resin. Examples of a method that use microparticles include the method stated in JP 5531388 B.

In the method for using phase separation, phase separation occurs due to spinodal decomposition (wet spinnodal decomposition) along with concentration condensation in the process of evaporating or removing solvent by drying or the like from the liquid phase of the composition containing a phase-separable resin component and a solvent, and then a surface concave-convex structure (a phase separation structure) with relatively regular interphase distance may be formed. The combination of the phase-separable resin components may be any of a combination of the photocurable resins, a combination of the photocurable resin component and a polymer component (thermoplastic resin), and a combination of polymer components, and may be, for example, a combination of a (meth) acrylic polymer (for example, poly methyl methacrylate, (meth) acrylic polymer having polymerizable groups, and the like) and cellulose esters (for example, cellulose acetate $C_{3-4}$ acylate such as cellulose acetate propionate) or polyester (for example, urethane modified polyester). Examples of a method that use phase separation include the methods described in JP 2007-187746 A, JP 2008-225195 A, JP 2009-267775 A, JP 2011-175601 A, and JP 2014-85371 A.

EXAMPLES

Hereinafter, the present invention will be described in more detail based on examples, however, the present invention is not limited by these examples. The raw materials used in the examples and the comparative examples are listed below, and the obtained anti-glare film was evaluated by the following methods.

Raw Materials

Acrylic polymer having polymerizable groups: "Cyclomer P" available from Daicel-Allnex Ltd.

Cellulose acetate propionate: "CAP-482-20" available from Eastman Chemical Company. Inc., degree of acetylation=2.5%, degree of propionylation=46%, and polystyrene equivalent number average molecular weight 75000

Nanosilica containing acrylic ultraviolet (UV) curable compound: "UVHC7800G" available from Momentive Performance Materials Japan LLC.

Silicone acrylate: "EB1360" available from Daicel-Allnex Ltd.

Urethane acrylate: "UA-53H" available from Shin-Nakamura Chemical Co., Ltd.

Dipentaerythritol hexaacrylate: "DPHA" available from Daicel-Allnex Ltd.

Silica-particle-containing acrylic resin formulation: "Z-757-4RL" available from Aika Kogyo Co., Ltd.

Acrylic resin formulation: "Z-757-4CL" available from Aika Kogyo Co., Ltd.

Fluorochemical compound A having polymerizable groups: "KY-1203" available from Shin-Etsu Chemical Co., Ltd.

Fluorochemical compound B having polymerizable groups: "Ftergent 602A" available from NEOS Company Limited.

Photoinitiator A: "Irgacure 184" available from BASF Japan Ltd.

Photoinitiator B: "Irgacure 907" available from BASF Japan Ltd.

Polyethylene terephthalate (PET) film: "DIAFOIL" available from Mitsubishi Plastics, Inc.

Cellulose triacetate (TAC) film: "Fuji tack TG60UL" available from FUJIFILM Corporation Measurement of Diffusion Reflection Intensity The back surface of an anti-glare film (the surface having no concave-convex structure, the surface opposite to the viewer side) was applied to a flat black acrylic plate having no unevenness or warpage via a transparent adhesive to manufacture an evaluation sample. Next, the evaluation sample was placed in a measurement device, and a luminous flux was emitted onto the surface on the anti-glare film side of the evaluation sample at a 45 degree angle from the normal line of the surface. Note that the 45 degrees, i.e., the specular reflection direction of the incident light, are defined as the diffuse specular reflection direction, and the reflection intensity in the diffuse specular reflection direction is defined as R. The diffusion reflection intensity of light was measured by implementing scanning by an optical receiver every 1 degree in a range from −45 degrees to +45 degrees with respect to the diffuse specular reflection direction, the light being from a light flux incident on the surface of an anti-glare film of the evaluation sample and then diffusely reflected, where a sum total of the diffusion reflection intensities is defined as V. In addition, as for the device for measuring the diffuse reflection intensity, "GP-200" available from Murami Color Research Laboratory, was used.

60 Degree Gloss

Measurement was performed, in compliance with JIS K7105, at an angle of 60 degrees using a gloss meter ("IG-320" available from HORIBA, Ltd.).

Transmission Image Clarity

Image clarity of the anti-glare film was measured, based on JIS K7105, using an image clarity meter (trade name "ICM-1T" available from Suga Test Instruments Co., Ltd.), where the film was placed such that the film-forming direction is parallel to the direction of the comb teeth of an optical comb. In the optical comb of the image clarity meter, the image clarity at the optical comb of 0.5 mm width was measured.

Manufacturing Example 1 of Anti-Glare Film 12.5 parts by weight of acrylic polymer having polymerizable groups, 4 parts by weight of cellulose acetate propionate, 150 parts by weight of nanosilica containing acrylic UV curable compound, 1 part by weight of silicone acrylate, 1 part by weight of photoinitiator A, and 1 part by weight of photoinitiator B were dissolved in a mixed solvent of 81 parts by weight of methyl ethyl ketone, 24 parts by weight of 1-butanol, and 13 parts by weight of 1-methoxy-2-propanol. The solution was cast onto a PET film using a wire bar #20, and then left in an oven at a temperature of 80° C. for 1 minute. The solvent was then evaporated to form a coat layer having a thickness of approximately 9 μm. Then, the coating layer was subjected to UV curing treatment by being irradiated with ultraviolet rays from a high-pressure mercury lamp for approximately 5 seconds, to thus obtain an anti-glare film A (a hard coat film).

Manufacturing Example 2 of Anti-Glare Film 15.0 parts by weight of acrylic polymer having polymerizable groups, 3 parts by weight of cellulose acetate propionate, 150 parts by weight of nanosilica-containing acrylic UV curable compound, 1 part by weight of silicone acrylate, 1 part by weight of photoinitiator A, and 1 part by weight of photoinitiator B were dissolved in a mixed solvent of 101 parts by weight of methyl ethyl ketone and 24 parts by weight of 1-butanol. The solution was cast onto a PET film using a wire bar #20, and then left in an oven at a temperature of 80° C. for 1 minute. The solvent was then evaporated to form a coat layer having a thickness of approximately 9 μm. Then, the coating layer was subjected to UV curing treatment by being irradiated with ultraviolet rays from a high-pressure mercury lamp for approximately 5 seconds, to thus obtain an anti-glare film B.

Manufacturing Example 3 of Anti-Glare Film

A solution, in which 77 parts of silica particle-containing acrylic resin formulation and 155 parts of acrylic resin formulation are mixed, was cast onto a TAC film using a wire bar #10, and then left for 1 minute in an oven at a temperature of 100° C. The solvent was then evaporated to form a coat layer having a thickness of approximately 6 μm. Then, the coating layer was subjected to UV curing treatment by being irradiated with ultraviolet rays from a high-pressure mercury lamp for approximately 5 seconds, to thus obtain an anti-glare film C.

Manufacturing Example 4 of Anti-glare Film 12.5 parts by weight of acrylic polymer having polymerizable groups, 5.5 parts by weight of cellulose acetate propionate, 149.2 parts by weight of nanosilica-containing acrylic UV curable compound, 0.1 parts by weight of fluorine-based compound B having polymerizable groups, 1 part by weight of photoinitiator A, and 1 part by weight of photoinitiator B were dissolved in a mixed solvent of 129 parts by weight of methyl ethyl ketone, 24 parts by weight of 1-butanol, and 13 parts by weight of 1-methoxy-2-propanol. The solution was cast onto a PET film using a wire bar #16, and then left in an oven at a temperature of 80° C. for 1 minute. The solvent was then evaporated to form a coat layer having a thickness of approximately 7 μm. Then, the coating layer was subjected to UV curing treatment by being irradiated with ultraviolet rays from a high-pressure mercury lamp for approximately 5 seconds, to thus obtain an anti-glare film D.

Manufacturing Example 5 of Anti-Glare Film 50 parts by weight of acrylic polymer having polymerizable groups, 4 parts by weight of cellulose acetate propionate, 76 parts by weight of urethane acrylate, 1 part by weight of silicone acrylate, 1 part by weight of photoinitiator A, and 1 part by weight of photoinitiator B were dissolved with a mixed solvent containing 176 parts by weight of methyl ethyl ketone and 28 parts by weight of 1-butanol. The solution was cast onto a PET film using a wire bar #18, and then left in an oven at a temperature of 80° C. for 1 minute. The solvent was then evaporated to form a coat layer of a thickness of approximately 9 μm. Then, the coating layer was subjected to UV curing treatment by being irradiated with ultraviolet rays from a high-pressure mercury lamp for approximately 5 seconds, to thus obtain an anti-glare film E.

Manufacturing Example 6 of Anti-Glare Film 50 parts by weight of acrylic polymer having polymerizable groups, 4 parts by weight of cellulose acetate propionate, 76 parts by weight of urethane acrylate, 1 part by weight of silicone acrylate, 1 part by weight of fluorine-based compound having polymerizable groups, 1 part by weight of photoinitiator A, and 1 part by weight of photoinitiator B were dissolved in a mixed solvent of 176 parts by weight of methyl ethyl ketone and 28 parts by weight of 1-butanol. The solution was cast onto a PET film using a wire bar #14, and then left in an oven at a temperature of 80° C. for 1 minute. The solvent was then evaporated to form a coat layer having a thickness of approximately 6 μm. Then, the coating layer was subjected to UV curing treatment by being irradiated with ultraviolet rays from a high-pressure mercury lamp for approximately 5 seconds, to thus obtain an anti-glare film F.

Manufacturing Example 7 of Anti-Glare Film 5.7 parts by weight of acrylic polymer having polymerizable groups, 1.2 parts by weight of cellulose acetate propionate, 4 parts by weight of dipentaerythritol hexaacrylate, 2.77 parts by weight of silicone acrylate, and 0.5 parts by weight of photoinitiator A were dissolved in a mixed solvent of 25 parts by weight of methyl ethyl ketone and 12.2 parts by weight of 1-butanol. The solution was cast onto a PET film using a wire bar #24, and then left in an oven at a temperature of 80° C. for 1 minute. The solvent was then evaporated to form a coat layer having a thickness of approximately 7 μm. Then, the coating layer was subjected to UV curing treatment by being irradiated with ultraviolet rays from a high-pressure mercury lamp for approximately 5 seconds, to thus obtain an anti-glare film G.

The diffusion reflection intensities of the obtained anti-glare films A to G were measured to calculate R/V, and moreover, the transmission image clarity and 60 degree gloss were measured, and the results are listed in Table 1.

TABLE 1

|  | A | B | C | D | E | F | G |
|---|---|---|---|---|---|---|---|
| R | 346.2 | 2385 | 96170 | 67.43 | 1350 | 6453 | 19870 |
| V | 12676 | 25540 | 279499 | 4831 | 29486 | 54990 | 88905 |
| R/V | 0.03 | 0.09 | 0.34 | 0.01 | 0.05 | 0.12 | 0.22 |
| Transmission image clarity (%) | 6 | 6 | 60.9 | 24.2 | 4.5 | 19 | 83 |
| 60 degree gloss (%) | 3 | 9 | 90 | 0.9 | 12 | 20 | 55 |

Further, as evidenced by FIG. 1 indicating a relationship between R/V and 60 degree gloss, R/V is correlated with the 60 degree gloss. Accordingly, a numerical value of R/V can be derived from a numerical value of the 60 degree gloss. In contrast, as evidenced by Table 1, no correlation was found between R/V and the transmission image clarity.

INDUSTRIAL APPLICABILITY

The manufacturing method according to an embodiment of the present invention is used for manufacturing an anti-glare film used in a variety of display devices, for example, display devices such as a liquid crystal display (LCD) device, a cathode tube display device, an organic or inorganic electroluminescence (EL) display, a field emission display (FED), a surface electric field display (SED), a rear-projection television display, a plasma display, a display device equipped with a touch panel, and the like, for example.

The invention claimed is:

1. A method for manufacturing an anti-glare film, the method comprising:
    an evaluation process for measuring gloss of a surface having a concave-convex structure for evaluating R/V, which is a ratio of a diffuse specular reflection intensity R to a sum total V of diffuse reflection intensities, wherein the diffuse specular reflection intensity R represents a diffuse reflection intensity measured at an aperture angle of 1 degree by a variable-angle photometer in a diffuse specular reflection direction when visible light is radiated, at an angle of 45 degrees from a normal line, to the surface having the concave-convex structure of the anti-glare film, and the sum total V of diffuse reflection intensities represents a sum total of diffuse reflection intensities measured at an aperture angle of 1 degree by a variable-angle photometer for every 1 degree from −45 degrees up to 45 degrees, including 0 degrees, with respect to the diffuse specular reflection direction when visible light is radiated, at an angle of 45 degrees from a normal line, to the surface having the concave-convex structure of the anti-glare film,
    preparing a calibration curve by measuring gloss and R/V of a plurality of anti-glare films each having a different gloss to obtain a correlation between gloss and R/V,
    wherein a lower limit of gloss at which R/V is 0.01 is predetermined, and then in the evaluation process, an anti-glare film having gloss exceeding the lower limit of gloss is manufactured,
    further comprising a concave-convex structure formation process for forming a concave-convex structure on a surface of an anti-glare film, wherein
    the concave-convex structure formation process and the evaluation process are continuously performed.

2. The method for manufacturing according to claim 1, wherein in the evaluation process, 60 degree gloss is measured.

3. The method for manufacturing according to claim 2, wherein an anti-glare film having 60 degree gloss that exceeds 45% is manufactured.

4. The method for manufacturing according to claim 1, wherein in the concave-convex structure formation process, a curable composition containing a curable resin is cured.

5. The method for manufacturing according to claim 4, wherein the curable composition contains microparticles.

6. The method for manufacturing according to claim 4, wherein the curable composition contains a phase-separable resin component.

7. The method for manufacturing according to claim 1, wherein an upper limit of R/V is 0.35 or less.

* * * * *